United States Patent
Kaufmann

(10) Patent No.: US 8,063,789 B2
(45) Date of Patent: Nov. 22, 2011

(54) METHOD AND APPARATUS FOR MONITORING THE MAXIMUM DISTANCE BETWEEN TWO OBJECTS

(75) Inventor: Hannes Kaufmann, Vienna (AT)

(73) Assignee: Mission Control Design GmbH, Vienna (AT)

( * ) Notice: Subject to any disclaimer, the term of this patent is extended or adjusted under 35 U.S.C. 154(b) by 586 days.

(21) Appl. No.: 12/298,412

(22) PCT Filed: Apr. 24, 2007

(86) PCT No.: PCT/AT2007/000187
§ 371 (c)(1),
(2), (4) Date: Oct. 24, 2008

(87) PCT Pub. No.: WO2007/121500
PCT Pub. Date: Nov. 1, 2007

(65) Prior Publication Data
US 2010/0219967 A1    Sep. 2, 2010

(30) Foreign Application Priority Data
Apr. 25, 2006    (AT) .................................. A 696/2006

(51) Int. Cl.
G08B 1/08    (2006.01)
G08B 17/10    (2006.01)
H04B 17/00    (2006.01)
H04B 1/16    (2006.01)
H04B 7/00    (2006.01)
H04W 24/00    (2009.01)

(52) U.S. Cl. ............. 340/686.6; 340/539.11; 455/226.1; 455/115.4; 455/438; 455/522; 455/456.3; 455/226.2; 455/226.4

(58) Field of Classification Search .................. None
See application file for complete search history.

(56) References Cited

U.S. PATENT DOCUMENTS

| 6,512,931 B1 * | 1/2003 | Park et al. .................. 455/522 |
| 6,697,616 B1 | 2/2004 | Heinz et al. |
| 6,983,140 B2 * | 1/2006 | Higuchi .................... 455/421 |
| 7,336,929 B2 * | 2/2008 | Yasuda et al. ............... 455/41.2 |

(Continued)

FOREIGN PATENT DOCUMENTS
DE    198 50 654 C 1    5/2000
(Continued)

OTHER PUBLICATIONS
Written Opinion of the International Searching Authority, International Application No. PCT/AT2007/000187, 8 pages.

*Primary Examiner* — Julie Lieu
(74) *Attorney, Agent, or Firm* — Hoffman & Baron, LLP

(57) ABSTRACT

A method and an apparatus for monitoring the maximum distance between two objects, in particular between a child and its guardian, with the aid of two transceivers, the first of which periodically transmits status messages of a particular transmission power to the second, wherein an alarm is triggered in the second transceiver if the reception of the status messages decrease, and wherein a statement of the transmission power is concomitantly transmitted in each status message, are distinguished by the fact that the transmission power to be used for the next status message is determined by comparing the reception power with the transmission power stated in a status message and is transmitted back to the first transceiver in a confirmation message.

12 Claims, 4 Drawing Sheets

U.S. PATENT DOCUMENTS

| | | | |
|---|---|---|---|
| 2002/0022495 A1* | 2/2002 | Choi et al. | 455/522 |
| 2006/0003776 A1* | 1/2006 | Natori et al. | 455/456.3 |
| 2006/0035660 A1* | 2/2006 | Anderson | 455/522 |
| 2009/0322513 A1* | 12/2009 | Hwang et al. | 340/539.12 |

FOREIGN PATENT DOCUMENTS

| | | |
|---|---|---|
| EP | 1613030 A1 | 1/2006 |
| EP | 1 613 030 A | 4/2006 |
| GB | 2 389 216 A | 3/2003 |

* cited by examiner

METHOD AND APPARATUS FOR MONITORING THE MAXIMUM DISTANCE BETWEEN TWO OBJECTS This application claims priority based on an International Application filed under the Patent Cooperation Treaty, PCT/AT2007/000187, filed on Apr. 24, 2007 and Austrian Application No. A 696/2006, filed on Apr. 25, 2006.

BACKGROUND OF THE INVENTION

The present invention relates to a method and device for monitoring the maximum distance between two objects, in particular, between a child and its guardian, with the help of two transceivers, of which the first periodically transmits status messages of a certain transmission power to the second, wherein an alarm is triggered in the second transceiver when the reception of the status messages decreases, and wherein information on the transmission power is also transmitted in each status message.

A method and a device of this type are known from U.S. Pat. No. 5,963,130. Because the communications between the transceivers is limited to periodic messages with intermediate pauses, energy consumption reduces. U.S. Pat. No. 5,963,130 shows, in detail, a child-monitoring device wherein the parent station evaluates the reception field strength of the polling reply of the child station and compares it with a threshold. When the value falls below the threshold, a power control command is integrated in the next polling query and transmitted to the child station. The child station then increases its reply transmission power and integrates into its reply message performance information that it is now transmitting at high power. The transmission power specified by the child station in its reply is used to trigger the range alarm: if the reply had been transmitted with high transmission power, the alarm is immediately triggered. The performance control command transmitted from the parent station to the child station thus always depends on only the reception field strength and its comparison with the fixed threshold. The principle of such a reception field strength evaluation does not allow detecting whether a weak reception field strength is to be traced to low transmission power or to a large distance.

For everyday, practical use of an object range monitoring device, in particular, for monitoring children for unintentional separation, running off, kidnapping, etc., a robust detector of when a maximum distance has been exceeded that is not susceptible to noise under any circumstances is indispensable, and all of this for minimal energy consumption. The invention sets the goal of creating a method and a device of the type mentioned above that satisfies these requirements.

SUMMARY OF THE INVENTION

In a first aspect, these goals are achieved with a method of the type mentioned above that distinguishes itself according to the invention in that, through comparison of the reception power with the transmission power specified in a status message, the transmission power to be used for the next status message is determined and transmitted back in a confirmation message to the first transceiver.

Through the comparison according to the invention of the reception power with the transmission power specified in the status message itself, the actual attenuation of the transmission channel is measured, even when, e.g., the child station has responded with low transmission power. Therefore, an especially reliable power regulation and effective reduction of the average transmission power is possible. The transmission power of the transceiver transmitting the status messages is adapted with each communications cycle to the actual requirements and prepared for the next communications cycle. The solution according to the invention requires, in each communications cycle, only a single message exchange between the transceivers, namely a single status message and a single confirmation message. Therefore, a very low average energy consumption is achieved, without endangering the reliability of the distance monitoring.

According to one preferred embodiment of the invention, the transmission power determined for the next status message is also used for the transmission of the confirmation message itself, by means of which the energy consumption is reduced even more.

Another preferred configuration of the method of the invention distinguishes itself in that, for the mentioned comparison, a difference is formed from the specified transmission power and measured reception power and compared with a threshold, and when the difference falls below the threshold, the transmission power to be used for the next status message is reduced to a minimum value, while when the difference exceeds the threshold, it is increased up to a maximum value, wherein in the latter case, an alarm is triggered if the specified transmission power already has the maximum value. The comparison, by forming a difference, permits an especially simple implementation of the method with economical 1-chip microcontrollers, which allows miniaturization of the transceivers.

It is especially advantageous when the transceivers move into an energy-saving sleep mode in a known way during the pauses of their periodic message exchange. The second transceiver is woken from this sleep mode before the first transceiver. In this way, a lower energy consumption is achieved, without there being the risk that the second transceiver misses a status message.

According to another advantageous embodiment, the status message and the confirmation message each contain at least one unique identifier assigned in an initialization step of two mutually associated transceivers, whereupon each transceiver processes only status or confirmation messages of the other associated transceiver. Therefore, several devices can be operated in one and the same area, without resulting in mutual interference; after "training" two transceivers in the initialization step, these react only to each other.

In a second aspect, the invention achieves its goals with a device of the type mentioned above that distinguishes itself in that the second transceiver is designed to determine the transmission power to be used for the next status message from a comparison of the reception power with the transmission power specified in a status message, and to transmit it back to the first transceiver in a confirmation message.

Preferably, the second transceiver is constructed to transmit the confirmation message with the transmission power determined for the next status message.

It is especially favorable when the second transceiver is constructed to form, for each status message, the difference of the specified transmission power and measured reception power and to compare it with a threshold, and when the difference falls below the threshold, the transmission power to be used for the next status message is reduced to a minimum value, while when the difference exceeds the threshold, it is increased to a maximum value and, in the latter case, to trigger the alarm if the specified transmission already has the maximum power.

With respect to the advantages of the device according to the invention and its mentioned preferred features, refer to the above explanations concerning the method.

Another advantageous embodiment of the device according to the invention distinguishes itself in that the second transceiver has a display device for the mentioned difference of the transmission power and reception power. The display device thus can also be used for direction finding, in that the transceiver is moved by way of trial in various directions and when the displayed difference decreases—which points to a smaller transmission attenuation and thus to a smaller distance between the transceivers—this direction is used for direction finding.

Advantageously, the first and/or the second transceiver are each equipped with an emergency call button that sends an emergency call message to the other transceiver, so that the device can also be used for calling for help.

In each case, it is especially favorable when the second transceiver, and preferably also the first transceiver, each has an acoustic alarm device and preferably also a vibrational alarm device that also allows the alerting of a distracted guardian or called person.

Preferably, the transceivers are configured in the shape of armbands. This allows an uncomplicated and comfortable use and thus guarantees high user acceptance.

BRIEF DESCRIPTION OF THE DRAWINGS

The invention will be explained in more detail below with reference to an embodiment shown in the accompanying drawings. Shown in the drawings are.

DETAILED DESCRIPTION OF THE INVENTION

Figure 1:
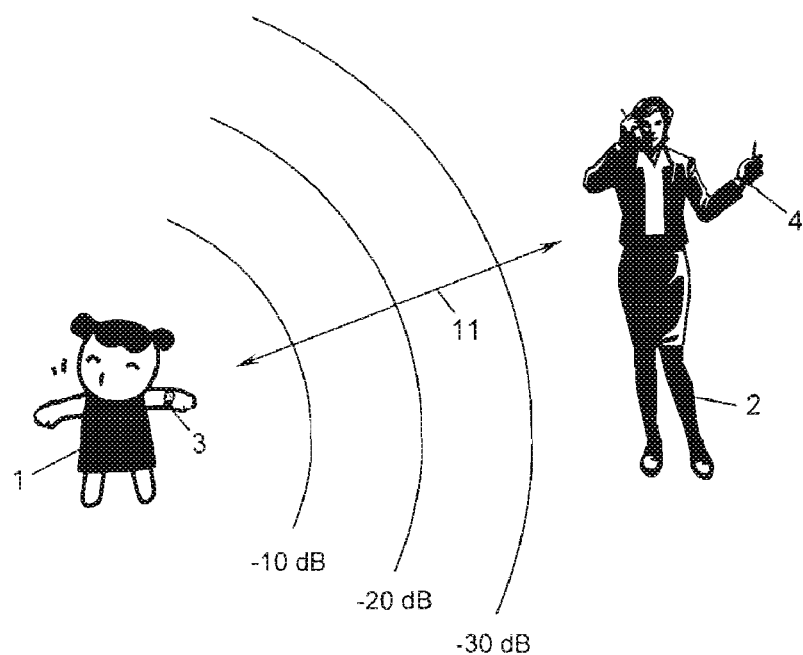
FIGS. 1 and 2, the device of the invention in practical use (FIG. 1) and in block circuit diagram (FIG. 2), FIG. 3, the method of the invention in the form of a sequence diagram, FIG. 4, the part of the method of the invention running in the first transceiver in flow chart form, and FIG. 5, the part of the method of the invention running in the second transceiver in flow chart form.
Figure 2:
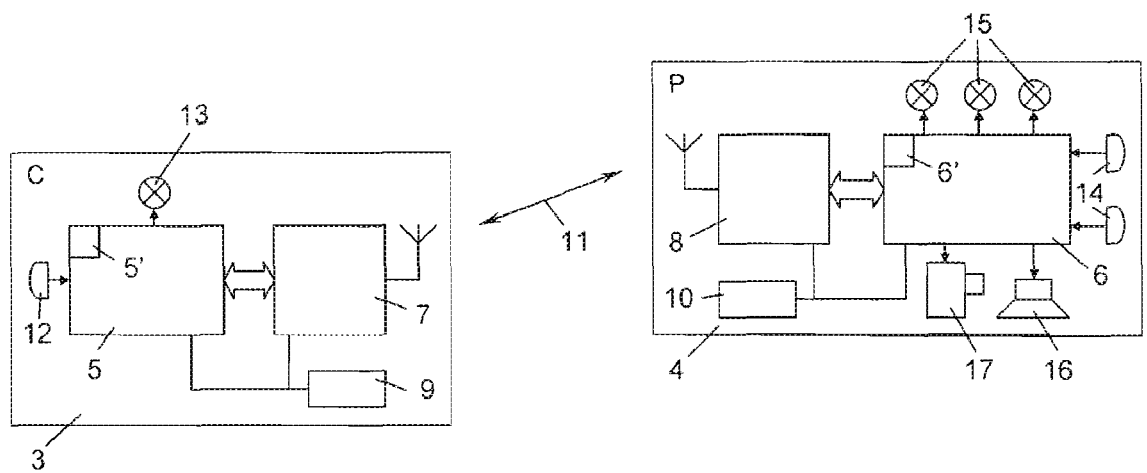

According to FIGS. 1 and 2, a device for monitoring the maximum distance between two objects, e.g., a child 1 by its guardian 2, comprises two transceivers 3, 4 that are configured in the form of armbands and worn by the child 1 and the guardian 2, respectively.

Each transceiver 3, 4 comprises a microcontroller 5, 6 with a bidirectional high-frequency transceiver 7, 8 connected to the respective microcontroller. These components are powered by a power supply 9, 10, e.g., a button battery. By means of the transceivers 7, 8, the transceivers 3, 4 are in communications connection with each other via a transmission channel 11.

The first transceiver 3 has a button 12 for selecting operating states and an LED 13 for displaying the same; in the same way, the second transceiver 4 is equipped with a keypad 14 in the form of two buttons for selecting operating states and a display device 15 in the form of several LED's for displaying the operating states. The second transceiver 4 also comprises an acoustic alarm device 16 and a vibrational alarm device 17.

Optionally, the first transceiver 3 can also be provided with a display device 15, an acoustic alarm device 16, and a vibrational alarm device 17.

The message traffic between the transceivers 3, 4 is now explained in more detail with reference to the method shown in FIGS. 3 to 5.

Figure 3:
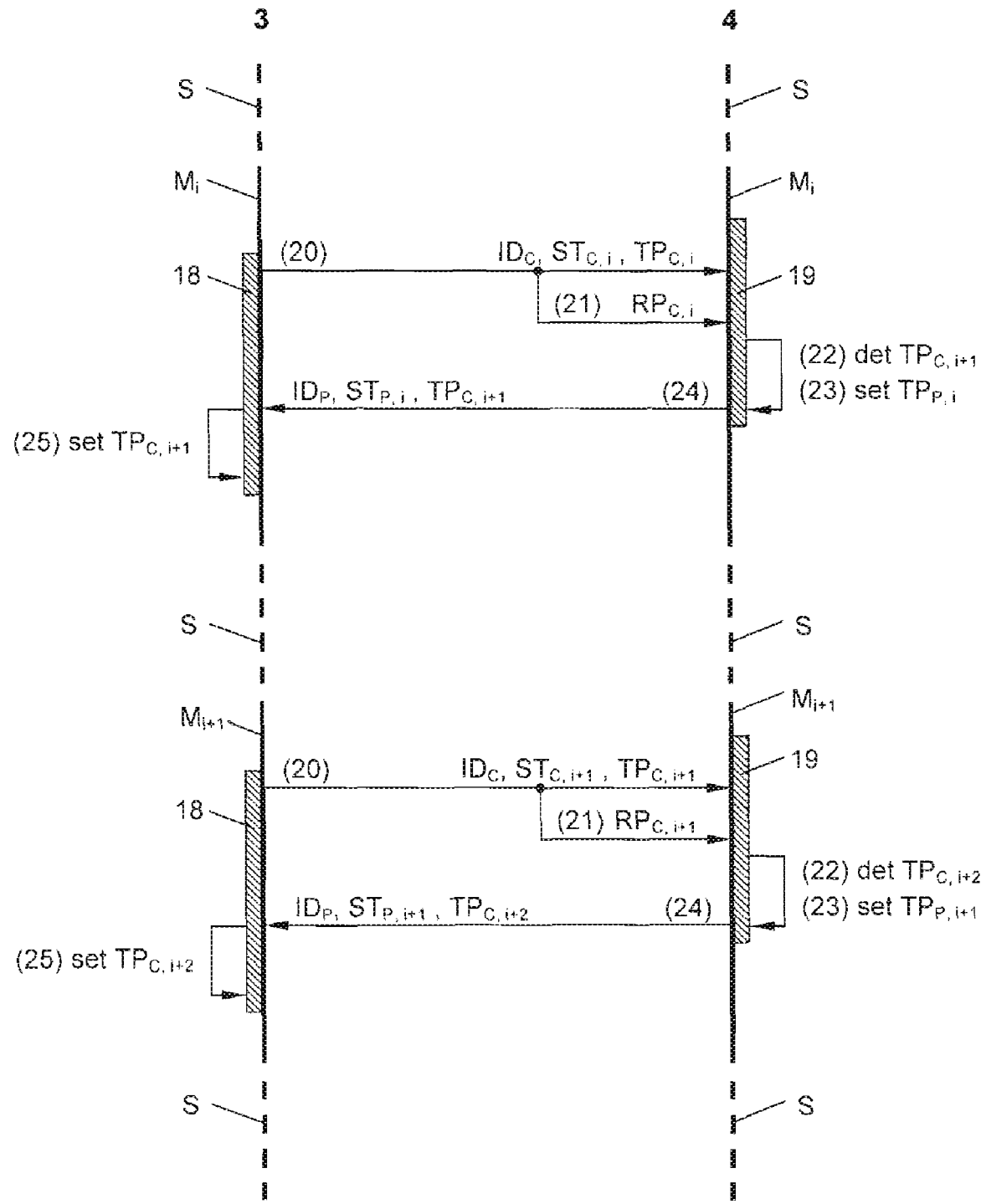

FIG. 3 shows two successive message exchanges $M_i$ and $M_{i+1}$ from the periodic message exchange $M_1$, $M_2$, ..., $M_1$ [sic; $M_i$], $M_{i+1}$, ... between the first transceiver 3 and the second transceiver 4. Between the individual message exchanges M there are pauses S, the length of which is shown significantly shortened; actually the length of a message exchange M lies on the order of magnitude of μs, whereas the length of the pauses S lies on the order of magnitude of 10 to 100 ms.

During the pauses S, the transceivers 3, 4 are moved into an energy-saving sleep mode, from which each of them, respectively controlled by a timer 5', 6' in the microcontroller 5 and 6, wake up for a process 18, 19. For each message exchange M, the timers 5', 6' are each synchronized anew.

As can be seen in FIG. 3, the timer 6' of the microcontroller 6 for waking the second transceiver 4 runs slightly earlier than that of the microcontroller 5 of the first transceiver 3, so that the process 19 begins shortly before the process 18.

In the processes 18 and 19 of each message exchange M, in a first step 20, the first transceiver 3 transmits a status message to the second transceiver 4. The status message comprises a unique identifier $ID_C$ of the first transceiver 3, a current status $ST_{C,i}$ of the first transceiver 3, and data $TP_{C,i}$ on the transmission power currently used by the transceiver 7 of the transceiver 3.

The second transceiver 4 receives the status message $ID_C$, $ST_{C,i}$, $TP_{C,i}$ of step 20 and, in step 21, measures the actual reception power $RP_{C,i}$ with which the status message is received at the location of the second transceiver 4 by its transceiver 8.

In step 22, the second transceiver 4 determines the transmission power $TP_{C,i+1}$ to be used in the next message exchange $M_{i+1}$ by the first transceiver 3 from a comparison of the transmission power $TP_{C,i}$ specified in the status message $ID_C$, $ST_{C,i}$, $TP_{C,i}$ with the reception power $RP_{C,i}$ measured in step 21, and transmits this transmission power in step 24 in the form of a confirmation message back to the first transceiver 3. The confirmation message comprises, in addition to the new transmission power $TP_{C,i+1}$, also a unique identifier $ID_P$ and also a current status $ST_{P,i}$ of the second transceiver 4. For the transmission of the confirmation message $ID_P$, $ST_{P,i}$, $TP_{C,i+1}$ in step 24, the second transceiver 4 sets the transmission power $TP_{P,i}$ of its transceiver 8 to the value $TP_{C,i+1}$ just determined (step 23).

After receiving the confirmation message $ID_P$, $ST_{P,i}$, $TP_{C,i+1}$ in step 24, the first transceiver 3 sets the transmission power of its transceiver 7, in preparation for the next status message, to the received value $TP_{C,i+1}$ (step 25). The transceivers 3, 4 end their processes 18 and 19 and fall back into their energy-saving standby or sleep mode for a pause S. After the timers 5', 6' run out in the microcontrollers 5, 6, the transceivers 3, 4 wake up for the next message exchange $M_{i+1}$, wherein now the status message is transmitted in step 20 with the new transmission power $TP_{C,i+1}$, and so on.

Figure 4:
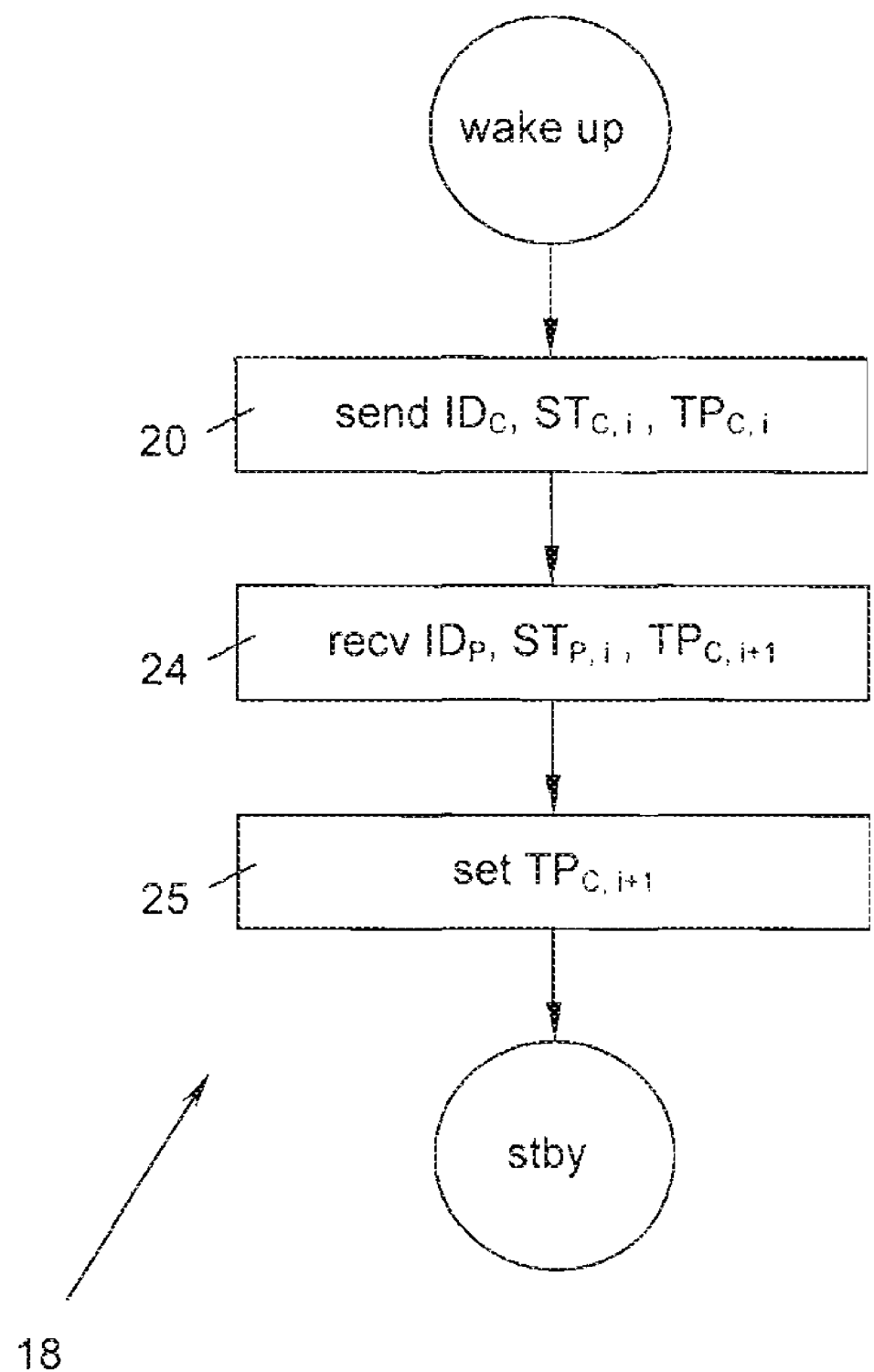
Figure 5:
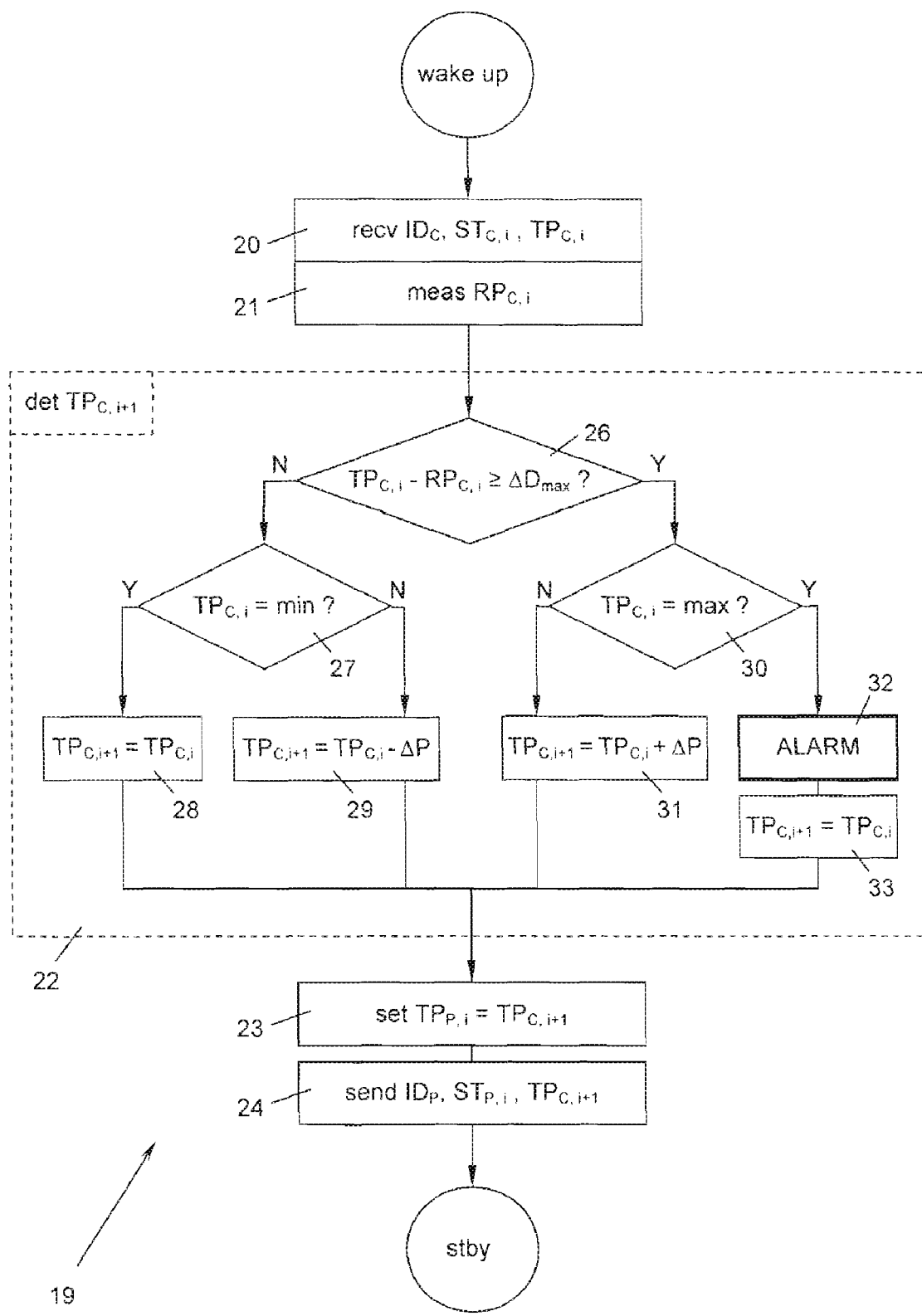

FIG. 4 shows the process 18 in the first transceiver 3, and FIG. 5 shows the process 19 in the second transceiver 4, and in particular, the determination of the transmission power $TP_{C,i+1}$ in step 22 in detail.

According to FIG. 5, in step 22 in a first block 26, a difference from the transmission power $TP_{C,i}$ specified in the status message of the first transceiver 3 and the reception power $RP_{C,i}$ measured by the second transceiver 4 is formed and compared with a given threshold $\Delta D_{max}$. The difference $TP_{C,i} - RP_{C,i}$ here stands for the attenuation of the transmission channel 11 between the transceivers 3, 4 and thus, for the distance separating the objects 1, 2, here the distance of the child 1 from its guardian 2 (FIG. 1). If the difference is below the threshold, there is still room for a reduction of the transmission power $TP_C$. With the help of the blocks 27, 28, and 29, the next transmission power $TP_{C,i-1}$ to be used in this case is reduced by a given value ΔP—as long as it has not already reached a minimum value min.

However, if the difference $TP_{C,i} - RP_{C,i}$ exceeds the preselected threshold $\Delta D_{max}$, the attenuation of the transmission channel 11 is too large and—as long as the transmission power $TP_{C,i}$ has not already reached a maximum value max (test 30)—in block 31 the transmission power $TP_{C,i+1}$ for the next message exchange $M_{i+1}$ is set, increased by the value ΔP.

However, if the transmission power $TP_{C,i}$ was already at its maximum value max, then another increase is no longer possible and the excess attenuation or difference $TP_{C,i} - RP_{C,i}$ is obviously to be traced back to exceeding of the permissible distance between the child 1 and the guardian 2. In this case, an alarm is triggered in block 32 and the maximum transmission power is maintained (block 33).

The invention is not limited to the illustrated embodiments, but instead comprises all variants and modifications that fall within the scope of the associated claims. For example, the device and method of the invention could also be used for monitoring the distance of other objects, such as animals or pets, for anti-theft protection of objects, such as skis, bicycles, strollers, KFZ [automobiles], for protecting avalanche victims, etc.

The invention claimed is:

1. A method for monitoring the maximum distance between two objects comprising the steps of:
   a first transceiver periodically transmitting status messages of a defined transmission power to a second transceiver; triggering an alarm in the second transceiver when reception of the status messages diminishes, and wherein data on the transmission power is also transmitted in each status message; comparing reception power with the transmission power specified in the status message; and determining and transmitting a transmission power to be used for the next status message back to the first transceiver in a confirmation message.

2. The method according to claim 1, wherein the transmission power determined for the next status message is also used for transmission of the confirmation message.

3. The method according to claim 1, wherein in the comparing step a difference is determined from the specified transmission power and the measured reception power and is compared with a threshold, and when the difference falls below the threshold, the transmission power to be used for the next status message is reduced to a minimum value while if the difference exceeds the threshold, the transmission power is increased to a maximum value wherein, in the latter case, if the specified transmission power already has the maximum value the alarm is triggered.

4. The method according to claim 1, wherein the transceivers enter into an energy-saving sleep mode during pauses in the periodic message exchange, from which the second transceiver awakes before the first transceiver.

5. The method according to claim 1, wherein the status message and the confirmation message each contain at least one unique identifier that is assigned in an initialization step of the first and second two transceivers, whereupon each transceiver processes only status and confirmation messages of the other transceiver.

6. Device for monitoring the maximum distance between two objects comprising:
   first and second transceivers wherein the first transceiver periodically transmits status messages of a defined transmission power to the second transceiver;
   wherein the second transceiver outputs an alarm when reception of the status messages decreases; and wherein the first transceiver also transmits data on the transmission power that is used in each status message; and further wherein the second transceiver is constructed to determine a transmission power to be used for the next status message from a comparison of the reception power with the transmission power specified in a status message, and transmits the transmission power back to the first transceiver in a confirmation message.

7. Device according to claim 6, wherein the second transceiver is constructed to transmit the confirmation message with the transmission power determined for the next status message.

8. Device according to claim 6, wherein the second transceiver determines the difference between the specified transmission power and the measured reception power for each status message and compares the difference with a threshold such that if the difference falls below the threshold, the transmission power to be used for the next status message is reduced to a minimum value and if the difference exceeds the threshold, the transmission power is increased to a maximum value and, in the latter case, triggers an alarm if the specified transmission power already has the maximum value.

9. Device according to claim 8, wherein the second transceiver has a display device to display the difference of the specified transmission power and the measured reception power.

10. Device according to claim 6, wherein the first and/or the second transceiver is each equipped with an emergency call button that transmits an emergency call message to the other transceiver.

11. Device according to claim 6, wherein at least one of the first and second transceiver includes at least one of an acoustic alarm device and a vibrational alarm device.

12. Device according to claim 6, wherein the first and second transceivers are constructed in the form of armbands.

* * * * *